United States Patent
Vukajlovic Kenehan et al.

(10) Patent No.: US 8,942,696 B2
(45) Date of Patent: Jan. 27, 2015

(54) METHODS AND ARRANGEMENTS FOR PERFORMING CELL MEASUREMENTS IN A CELLULAR COMMUNICATION SYSTEM HAVING MULTIPLE ANTENNA PORTS

(75) Inventors: Vera Vukajlovic Kenehan, Stockholm (SE); Walter Müller, Upplands Väsby (SE); Muhammad Kazmi, Bromma (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 285 days.

(21) Appl. No.: 13/127,336

(22) PCT Filed: Oct. 30, 2009

(86) PCT No.: PCT/SE2009/051234
§ 371 (c)(1), (2), (4) Date: May 3, 2011

(87) PCT Pub. No.: WO2010/062238
PCT Pub. Date: Jun. 3, 2010

(65) Prior Publication Data
US 2011/0217972 A1 Sep. 8, 2011

Related U.S. Application Data

(60) Provisional application No. 61/110,638, filed on Nov. 3, 2008.

(51) Int. Cl.
*H04W 24/00* (2009.01)
*H04B 17/00* (2006.01)
*H04B 7/06* (2006.01)

(52) U.S. Cl.
CPC ........ *H04B 17/0045* (2013.01); *H04B 17/0067* (2013.01); *H04B 7/0689* (2013.01)
USPC .............. 455/423; 455/67.11; 455/562.1; 343/853; 343/879

(58) Field of Classification Search
USPC ............... 455/423, 424, 67.11, 560, 562.1; 343/893, 826, 835, 853, 879
See application file for complete search history.

(56) References Cited

U.S. PATENT DOCUMENTS 7,574,210 B2 * 8/2009 Kim et al. ..................... 455/436
(Continued)

OTHER PUBLICATIONS

3GPP. 3rd Generation Partnership Project; Technical Specification Group Radio Access Network; Evolved Universal Terrestrial Radio Access (E-UTRA); Physical layer-Measurements (Release 8); 3GPP TS 36.214 V8.4.0 (Sep. 2008). Sep. 1, 2008, pp. 1-11.
(Continued)

*Primary Examiner* — Marcos Torres

(57) ABSTRACT

The present invention relates to a method and arrangement in a cellular communication system, in particular to methods and arrangements in a user equipment and a network node for reporting cell measurement results. The present invention provides improved methods and arrangements for reporting cell measurements without significantly increasing the complexity in the cell measurement procedure. The user equipment reports the number of transmit antenna ports used for performing cell measurements on each of the neighbouring cell in its measurement report to the network node. The network node receives the number of transmit antenna ports which enables the network to be aware of the actual number of antenna ports that are used for cell measurements.

32 Claims, 8 Drawing Sheets

(56) References Cited

U.S. PATENT DOCUMENTS

| | | | |
|---|---|---|---|
| 7,653,393 B2* | 1/2010 | Kim et al. | 455/437 |
| 7,885,235 B2* | 2/2011 | Mochizuki et al. | 370/331 |
| 2004/0131029 A1* | 7/2004 | Tobe et al. | 370/331 |
| 2005/0032542 A1* | 2/2005 | Wilborn et al. | 455/525 |
| 2006/0009227 A1* | 1/2006 | Cudak et al. | 455/450 |
| 2006/0058033 A1* | 3/2006 | Marsan et al. | 455/449 |
| 2009/0176463 A1* | 7/2009 | Raaf et al. | 455/101 |
| 2010/0034314 A1* | 2/2010 | Brown et al. | 375/295 |

OTHER PUBLICATIONS

3GPP. 3rd Generation Partnership Project; Technical Specification Group Radio Access Network; Evolved Universal Terrestrial Radio Access (E•UTRA); Physical Channels and Modulation (Release 8); 3GPP TS 36.211 V8.4.0 (Sep. 2008). Sep. 1, 2008, pp. 1-73.

Ericsson. RSAP measurements for multiple antenna ports. 3GPP Draft; R1•082466, 3rd Generation Partnership Project (3GPP), Mobile Competence Centre ; 650, Route Des Lucioles ; F-06921 Sophiaantipolis Cedex ; France, vol. RAN WG1, no. Warsaw, Poland; Jun. 24, 2008.

* cited by examiner

METHODS AND ARRANGEMENTS FOR PERFORMING CELL MEASUREMENTS IN A CELLULAR COMMUNICATION SYSTEM HAVING MULTIPLE ANTENNA PORTS

This application claims the benefit of U.S. Provisional Application No. 61/110,638, filed Nov. 3, 2008, the disclosure of which is fully incorporated herein by reference.

TECHNICAL FIELD

The present invention relates to a method and arrangement in a cellular communication system, in particular to methods and arrangements in a user equipment and a network node for reporting cell measurement results.

BACKGROUND

In the forthcoming evolution of the mobile cellular standards, new transmission techniques like OFDM (Orthogonal Frequency-Division Multiplexing) will be used. Furthermore, in order to have a smooth migration from existing cellular systems to new high capacity high data rate systems in existing radio spectrum, a new system has to be able to operate in a flexible bandwidth. A proposal for such a new flexible cellular system is denoted the $3^{rd}$ Generation Long Term Evolution (3G LTE) and can be seen as an evolution of the 3G WCDMA (Wideband Code Division Multiple Access) standard. This system will use OFDM as multiple access technique (called OFDMA) in the downlink and single carrier frequency division multiplexing (SC-FDMA) in the uplink. In both downlink and uplink the LTE will be able to operate on bandwidths ranging from 1.25 MHz to 20 MHz. Furthermore, data rates up to 100 Mb/s in the downlink and 50 Mb/s in the uplink will be supported for the largest bandwidth. However, not only high rate services are expected to use 3G LTE, but also low rate services like voice. Since 3G LTE is designed for the Internet protocol suite TCP/IP, Voice over Internet Protocol (VoIP) will be the service carrying speech.

Another important aspect of LTE is the mobility function as described in document 3GPP TS 36.300, "Overall description; stage 2". This means that cell search as well as efficient neighbour cell measurements is of major importance in order for a user equipment (UE) to be able to stay connected to a suitable serving cell in the cellular communication system.

In release 8 of the 3GPP-specifications the base station can be equipped with 1, 2 or 4 transmit antennas. UE support for receiving signals from 1, 2 or 4 is mandatory but it is up to the base station to deploy 1, 2 or 4 transmit antennas. A deployment scenario with equal number of transmit antenna ports 10 at the base station sites 11 in a coverage area is shown in FIG. 1*a* and a deployment scenario with unequal number of transmit antenna ports at the base station sites 11 in another coverage area is shown in FIG. 1*b*. Use of more transmit antennas at the base station improves system performance by providing spatial diversity especially in radio environments of certain characteristics e.g. stationary situation (e.g. when the UE 12 is slow moving or static) or in radio environments with very low delay spread. However, an increase in the number of transmit antennas at the base station may also increase cost, complexity, signalling overheads etc. Therefore due to the factors such as desired system capacity, channel environment, cost consideration etc different number of transmit antennas are likely to be used in typical network setup.

An unequal number of antennas used at different base station sites also impacts the neighbour cell measurements. In LTE, information related to the exact number of antennas used at neighbour cells is not signalled to the UE because the signaling of an explicit neighbour cell list, which would contain neighbour cell specific information such as number of antennas, transmission bandwidth etc, is not mandatory in LTE. Thus in typical LTE deployment the network will not provide the UE with a neighbour cell list including the number of antennas used at the neighbour cells. In the absence of explicit neighbour cell antenna information, the UE will have to either read system information of the neighbour cell or blindly detect the presence of additional antennas. The blind detection requires that the UE performs correlation over expected reference signals (or pilot symbols) belonging to the additional antenna(s). As previously mentioned, one main advantage of use of multiple transmit antennas is to achieve spatial diversity.

In stationary conditions (i.e. when UE is stationary or moving very slowly) use of one antenna for neighbour cell measurements would not provide any time diversity. Thus, signals undergoing a fading dip will stay consistently or at least for a considerable period of time at lower received level. There is high risk that a UE camps on or perform handover to a weaker cell resulting in loss of received SNR (signal-to-noise ratio). In such circumstances it is important that the UE uses more than one antenna for neighbour cell measurements. It is also important to note that LTE is envisaged to provide broadband coverage to static or quasi-static users. Hence in typical LTE network there will be considerable number of users operating at negligible or very low speed but at the same time using higher data rate services.

In LTE, Reference Signal Received Power (RSRP) and/or reference signal received quality (RSRQ) are used for handover measurements, i.e. the UE needs to measure RSRP and RSRQ on the serving cell as well as on detected (by cell search) neighbouring cells. RSRP is defined as the average signal power of the transmitted Reference Symbols or Signals (RS) (transmitted by the eNode B). RSRQ is the ratio of RSRP to RSSI, where RSSI is the total received power from serving cell, non serving cells as well as from all other noise sources. RSRQ is a function of RSRP so for brevity we will focus on RSRP in the proceeding sections.

The RS's are transmitted from the radio base station i.e. Node B from each of possibly 1, 2 or 4 transmit antennas, on certain Resource Elements (RE) in the time-frequency grid, i.e. in some sub-carriers (every $6^{th}$) in OFDM symbol 0 and 3/4 (long/short CP) in every slot (consisting of 6/7 OFDM symbols). Furthermore, the RS in symbol 3/4 is offset by 3 sub-carriers relative to the RS in the first OFDM symbol. FIG. 2 shows the REs used for RS for transmit antenna 1 (denoted R) and a potential transmit antenna 2 (denoted S). Ideally, the RSRP should be based on RS from transmit (TX) antenna 1 and 2 (if 2 or more TX antennas are used). However, the number of TX antennas used for a detected neighbouring cell (i.e. a cell detected in the cell search procedure but the UE currently not connected to) is typically not known in advance for the UE and need to be blindly detected. For low SIRs, (i.e. the typical case for neighbouring cells, having signal power lower than the serving cell) there is a significant risk of erroneous detection of the number of TX antennas, making RSRP measurements based on a potential second TX antenna highly unreliable having a potentially large bias. The straight-forward solution to this problem is to do a more advanced TX antenna detection algorithm (to be sure to detect the number of eNode B antennas) which typically means long time, power and/or hardware consuming FFT (fast Fourier transform) processing of neighbouring cell data which directly impact the signal power estimate processing complexity and therefore not desirable.

Once the UE has performed measurements on neighbouring cells that fulfill certain quality, the UE provides the measured result to the network (usually known as the measurement report). The result includes cell identities of the cells fulfilling conditions set by the network as well as RSRP result for each of the cell.

For determination of the RSRP estimate it is typically assumed that the channel for sub carriers is constant over a certain number of sub-carriers (i.e. in frequency) and OFDM symbols (i.e. in time) (see FIG. 2) and does coherent average over such a "constant" area or time-frequency grid to get a channel estimate $H_i$. In FIG. 2, Yi, Ri and Ei are the received reference signal at the UE, transmitted signal (i.e. reference signal) by the eNode B and noise signal respectively. Then, the absolute square $|H_i|^2$ is taken to obtain a signal power estimate over such a block (i.e. "constant" area or time-frequency grid) and a non-coherent average over such signal power estimate blocks over the entire measurement bandwidth (typically 1.4 MHz, or 6 resource blocks) is performed to determine the total RSRP estimate. However, in case of delay spread and/or Doppler shift, the channel will not be perfectly constant over such a coherent block, leading to a bias in RSRP estimates. This problem could be addressed by using more advanced channel and signal power estimate methods (for instance based on advanced filtering techniques), which, however, also implies the drawback that these advanced methods are complex and heavy computations need to be done on each detected neighbouring cell. This in turn increases UE complexity and also leads to increase in UE power consumption.

SUMMARY

It is therefore an object of the present invention to provide an improved method and arrangement for reporting cell measurements without significantly increasing the complexity in the cell measurement procedure.

The above stated object is achieved by means of a method and an arrangement according to the independent claims.

According to a first aspect of the present invention a method in a user UE adapted to be used in a cellular communication system is provided. The method is used for reporting cell measurement results from the UE via a radio interface between the UE and a network node in a cell serving the UE. The method comprises the step of detecting one or more transmit antenna ports at a neighbouring cell. The method further includes performing cell measurement on at least one detected transmit antenna port. Furthermore, the method comprises generating a measurement report message. The measurement report message comprises a cell measurement result based on the performed cell measurement and information indicating the one or more transmit antenna ports on which the cell measurement was performed. The method also includes sending the measurement report message to said network node.

According to a second aspect of the present invention a method in a network node of a cellular communication system for receiving cell measurement results is provided. The method comprises receiving a measurement report message from a UE. The measurement report message comprises a cell measurement result based on a performed cell measurement on one or more transmit antenna ports at a neighbouring cell. The measurement report message also includes information indicating the one or more transmit antenna ports on which the cell measurement was performed. Moreover, the method comprises interpreting said cell measurement result and said information indicating the one or more transmit antenna ports. The method also includes determining an accuracy of said cell measurement result based on said one or more transmit antenna ports.

According to a third aspect of the present invention an arrangement adapted to be used in a UE is provided. The UE is adapted to be used in a cellular communication system for reporting cell measurement results from the UE via a radio interface between the UE and a network node in a cell serving the UE. The arrangement comprises a unit for detecting one or more transmit antenna ports at a neighbouring cell. It further includes a unit for performing cell measurement on at least one detected transmit antenna port. The arrangement also comprises a unit for generating a measurement report message. The measurement report message comprises a cell measurement result based on the performed cell measurement and information indicating the one or more transmit antenna ports on which the cell measurement was performed. The arrangement also includes a transmitter for sending the measurement report message to said network node.

According to a fourth aspect of the present invention an arrangement adapted to be used in a network node of a cellular communication system for receiving cell measurement results is provided. The arrangement comprises a receiver for receiving a measurement report message from a UE. The measurement report message comprises a cell measurement result based on a performed cell measurement on one or more transmit antenna ports at a neighbouring cell. It also includes information indicating the one or more transmit antenna ports on which the cell measurement was performed. The arrangement comprises also a unit for interpreting said cell measurement result and said information indicating the one or more transmit antenna ports. Additionally, the arrangement includes a unit for determining an accuracy of said cell measurement result based on said one or more transmit antenna ports.

An advantage of embodiments of the present invention is that they enable the network to be aware of the actual number of antenna ports that are used for cell measurements.

Another advantage of embodiments of the present invention is that they allow the network to apply possible compensation to the cell measurement results, thereby ensuring consistent behaviour in mobility decisions.

Yet another advantage of embodiments of the present invention is that the probability of call dropping can be significantly reduced.

Further advantages and features of embodiments of the present invention will become apparent when reading the following detailed description in conjunction with the drawings.

BRIEF DESCRIPTION OF THE DRAWINGS

For a better understanding, reference is made to the following drawings and preferred embodiments of the invention.

DETAILED DESCRIPTION

Figure 1B:
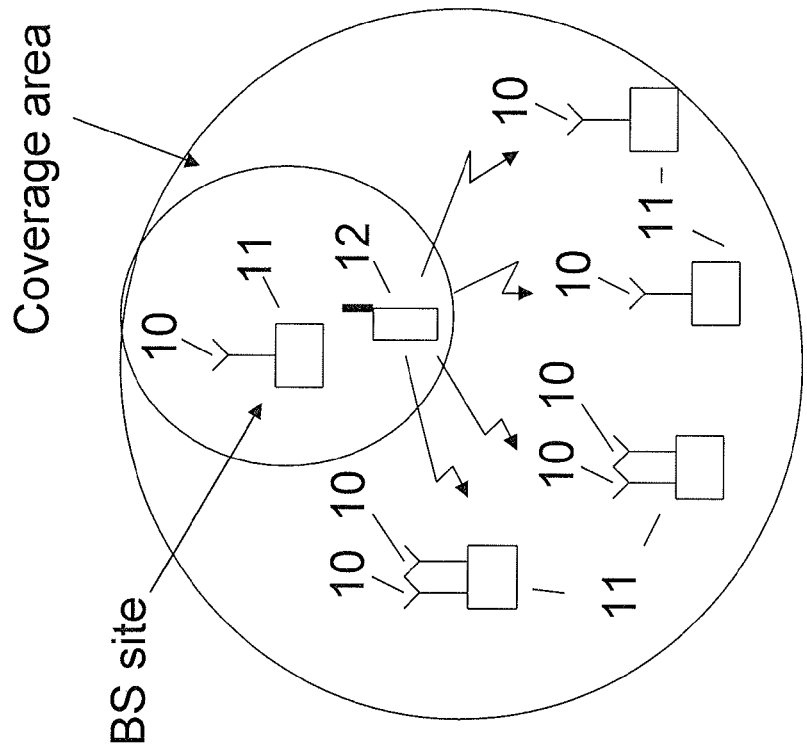
FIG. 1b illustrates a deployment scenario with unequal number of transmit antennas at the base station sites.

In the following description, for purposes of explanation and not limitation, specific details are set forth, such as particular sequences of steps, signaling protocols and device configurations in order to provide a thorough understanding of the present invention. It will be apparent to one skilled in the art that the present invention may be practised in other embodiments that depart from these specific details. In the drawings, like reference signs refer to like elements.

In this description it should be noted that in the embodiments of the present invention the network node is described as being a radio base station such as an eNode B in E-UTRAN. However, the network node could also be implemented as a radio network controller (RNC) in UTRAN. Furthermore, even if the term eNode B is used, the present invention is applicable to all network nodes having a similar functionality as the network nodes as the eNode Bs in the E-UTRAN. Thus, the present invention is not limited to UTRAN or E-UTRAN but can be used in any radio access network having a similar architecture as the mentioned networks.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

Figure 1A:
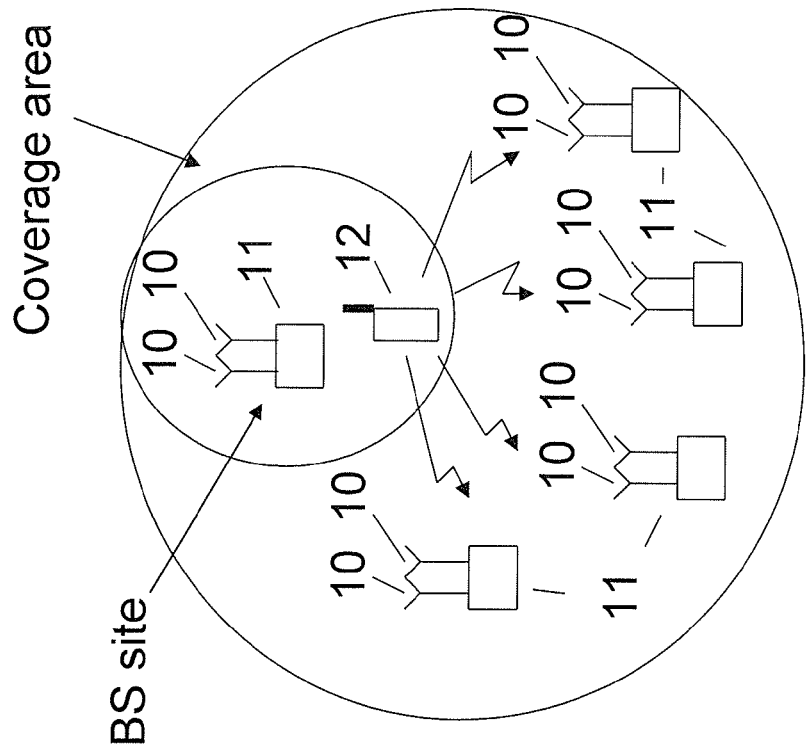
FIG. 1a illustrates a deployment scenario with equal number of transmit antenna ports at the base station sites.
Figure 2:
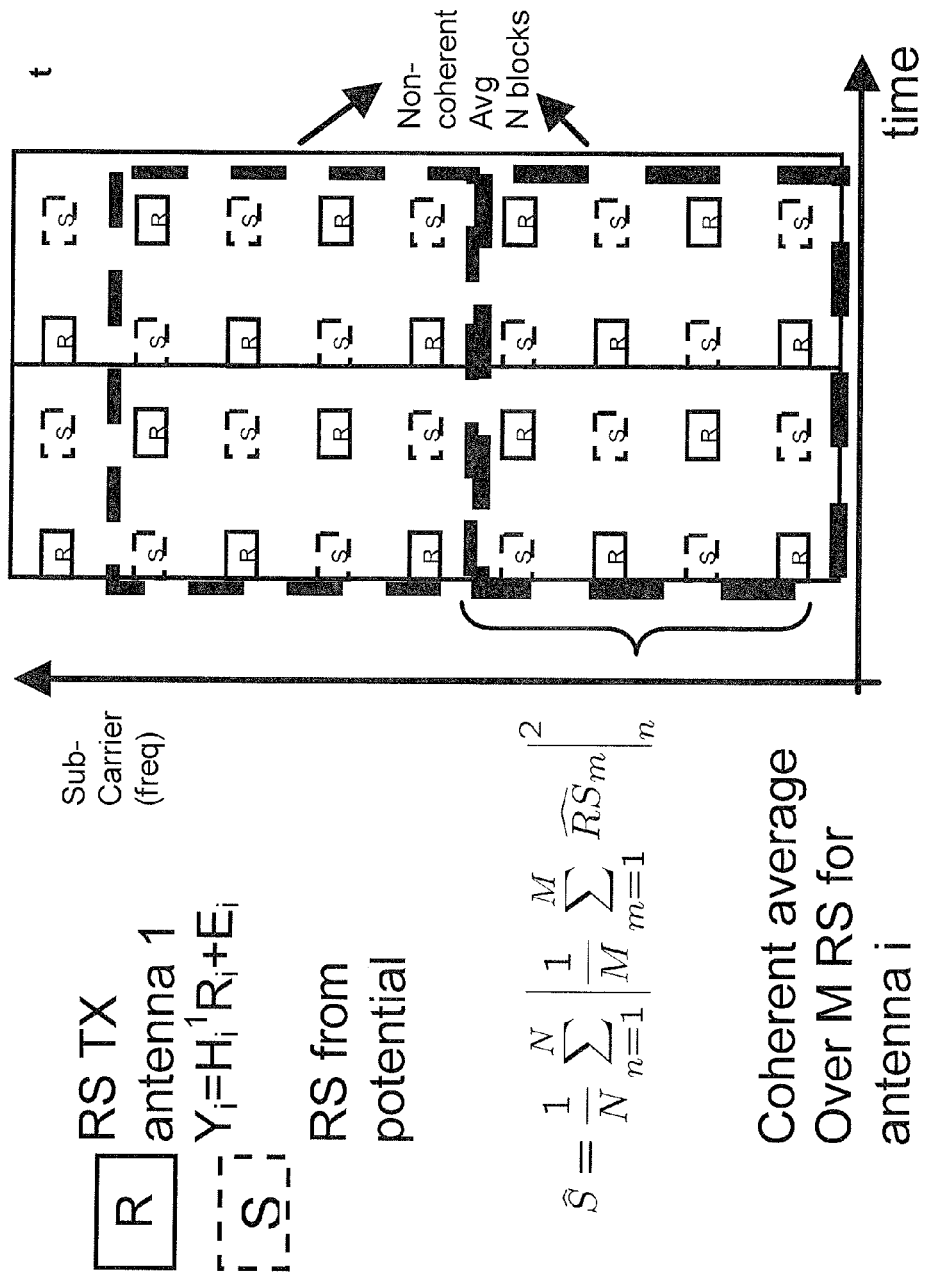
FIG. 2 illustrates reference symbols used for neighbour cell measurements from antenna port number 1 and number 2 in E-UTRAN.

The present invention relates to methods and arrangements in a user equipment and a radio base station for reporting cell measurement results in a cellular communication system. FIG. 1b illustrates a part of the cellular communication system, wherein a base station 11 covering a cell is denoted 11 in the figure. The UE 12 in the serving cell tries to measure on the measurement signals of cells in the neighbourhood of the serving cell. In such a communication system it could be entirely up to the UE implementation whether to use more than one transmit antenna port 10 for neighbour cell measurements e.g. in a communication system according to the LTE specifications. However, even if the UE 12 performs the neighbour cell measurements on more than one transmit antenna port 10 at the neighbour cell; the network has no knowledge about what the UE 12 is reporting. On the other hand, as mentioned previously, detection of additional transmit antenna ports at the neighbour cell (i.e. more than one antenna port) may not be implemented by UE vendors due to cost and complexity reasons. In order to have at least some degree of control and understanding on the cell measurements performed by the UE 12, the network has the possibility to aid the UE 12 and indicate whether all the neighbouring cells have the same number of transmit antenna ports as the serving cell on which the UE 12 is currently camping on in radio resource control (RRC) idle mode or connected to in RRC connected mode. This in effect means that in case the serving cell and all the neighbouring cells have for example two transmit antenna ports 10, as in the deployment scenario depicted in FIG. 1a, it is possible to benefit as all UEs will measure on both transmit antenna ports 10 and the network is aware of what the UE is reporting. As soon as one single neighbouring cell has a different number of antenna ports than the serving cell the UEs 12 are required to measure on a single transmit antenna ports since the network has to signal that not all the neighbouring cells have the same number of antenna ports. It is very likely that there will be deployments where neighbouring cells have different number of antenna ports 10, as in the deployment scenario depicted in FIG. 1b. However, there is no awareness what the UE 12 is measuring on as well as no benefits in scenarios where neighbouring cell has more then one transmit antenna port 10.

According to an embodiment of the present invention the UE 12 reports the number of transmit antenna ports 10 used for performing measurements on each of the neighbouring cell in its measurement report to the network node 11. According to another embodiment of the present invention the network node 11 receives the number of transmit antenna ports 10 used for performing measurements on each of the neighbouring cell in the measurement report from the UE 12.

In the following embodiments the term cell measurement results describes the result of the measurement of the neighbouring cell e.g. result of measured signal values important for mobility such as RSRP. The term measurement report message describes the message that the UE generates and sends to the network node after cell measurement has been performed by the UE in order to inform the network node of the outcome of the cell measurement. Moreover, the UE could reside in different radio environments such as macro cellular, microcellular and indoor environments. The term radio environment characteristics is characterised by several factors and parameters namely: distance attenuation or path loss, carrier frequency, delay spread, UE speed or Doppler frequency, etc. For instance in macrocellular environment typically UE speed or Doppler frequency is higher than that in an indoor environment. However delay spread is generally largest in a microcellular environment.

Figure 3A:
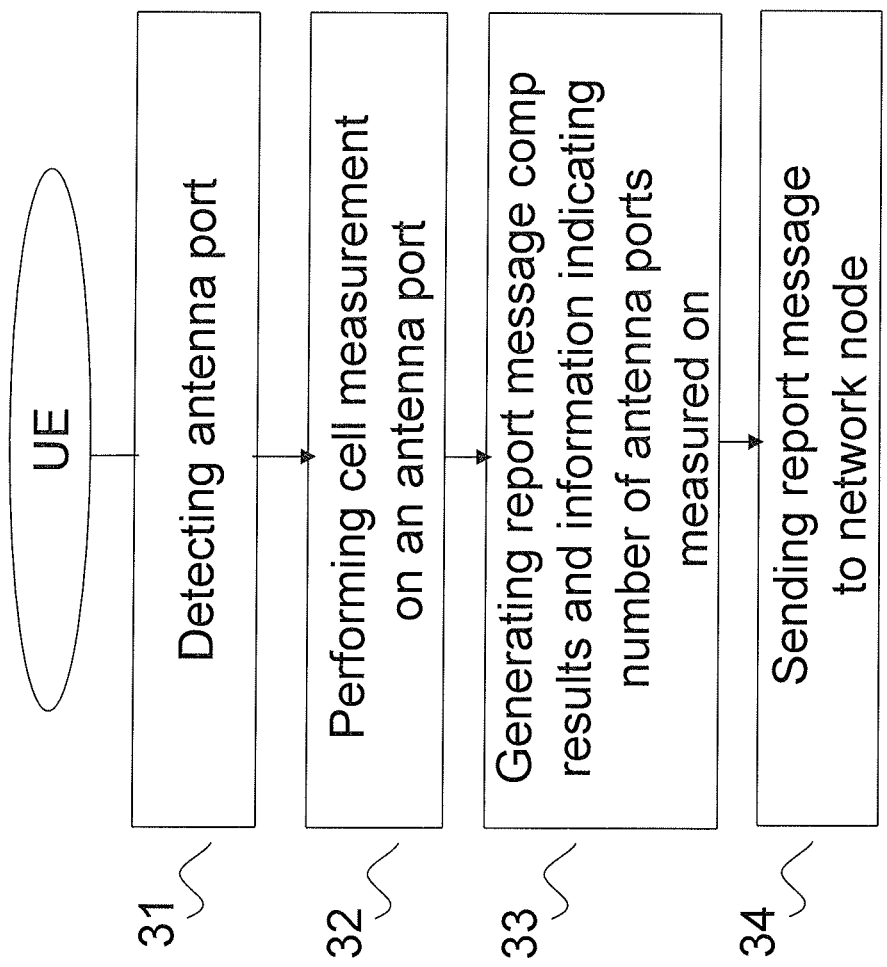
FIGS. 3a and 3b are flowcharts of the method in a user equipment according to embodiments of the present invention.

FIG. 3a shows a flowchart of the method in a UE according to an embodiment of the present invention. In a step 31, the UE detects a first transmit antenna port by detecting a reference signal (RS) sent at the first transmit antenna port from an eNode B serving a neighbouring cell. Once the UE has detected a new neighbour cell, the UE attempts to detect the presence of additional antenna ports in that cell because the number of eNode B transmit antenna ports is unknown for the UE and they need to be detected. This can be done by a suitable detection method e.g. correlation over reference symbols sent by different transmit antenna ports. Typically this is a complex process at low geometry factors i.e. low signal power for the particular neighbouring cell relative the sum of power of other cells and noise. The RSRP values for the first cell could be −3 dB below the RSRP for the strongest detected cell which typically is the serving cell. At signal-to-noise ratio (SNR) or geometry factor levels below −3 dB the received signal is quite weak and detection of additional antenna ports is quite unreliable. However, RSRP above −3 dB relative to the strongest detected cell, the transmit antenna port detection performance becomes more reliable. Hence, once the UE has detected a second transmit antenna port, the UE starts to do RSRP measurements based on both the first transmit antenna port and the second transmit antenna port as shown in step 32. It should be noted that in LTE RSRP and RSRQ measurements can be performed on up to two transmit antenna ports even if there exists more than two transmit antenna ports at the eNode B. However, future evolution could consider more than two transmit antenna ports for neighbour cell measurements.

From the above explanation it follows that the use of a plurality of transmit antenna ports for cell measurements would largely be influenced by the received signal level of the neighbour cell at the UE. The current RSRP and RSRQ cell measurement requirements are applicable to geometry factor down to −6 dB. Hence, typically a UE may use either one or both transmit antenna ports for performing cell measurement even if it implements blind detection of transmit antenna ports for every eNode B. The reason is that for a neighbour cell at low SNR (e.g. below −3 dB), the UE may use only one antenna port to measure RSRP and RSRQ. However, UE may use two transmit antenna ports for measuring RSRP and RSRQ from cells which are above −3 dB.

In a step 33, once the network-defined criteria have been fulfilled for the measured neighbour cell, the UE generates a measurement report message comprising a cell measurement result based on the performed cell measurement. The measurement report message comprises further information indicating the number of transmit antenna ports i.e. one or more transmit antenna ports on which the cell measurement was performed. In a further embodiment of the present invention the information is provided in one or two bits in the measurement report message indicating the number of transmit antenna ports that were used for performing measurements for each of the reported neighbouring cells. The measurement report message is then sent to the network node in a step 34. With this possibility, regardless whether the network node provides the UE with the information on available transmit antenna ports or not or whether it indicates that all the neighbour cells have the same number of transmit antenna ports or not, the UE can utilize the possibility to detect a plurality of transmit antenna ports and perform measurement thereon while the network at the same time is made aware of what the UE has measured on.

Figure 3B:
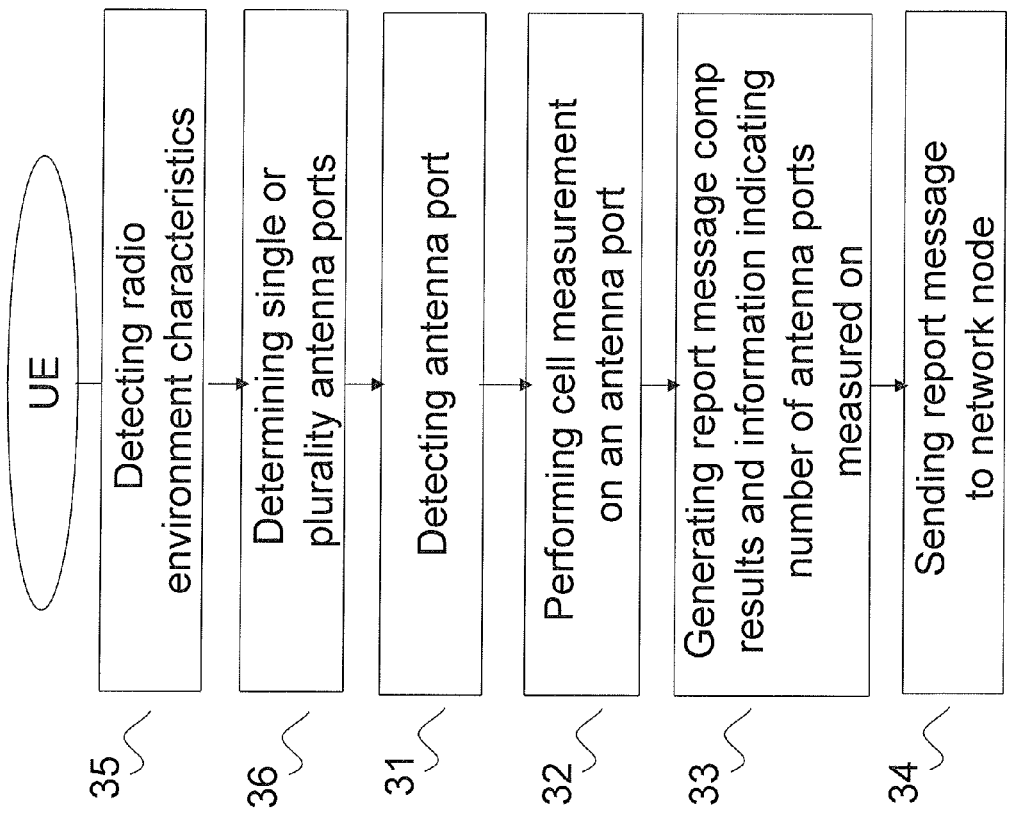

According to a further embodiment of the present invention in a step 35 in FIG. 3b, the UE detects selected radio environment characteristics of the UE by using a suitable mechanism. In a step 36, the UE determines based on the detected selected radio environment characteristics whether to detect a single transmit antenna port or attempt to detect a plurality of transmit antenna ports in step 31. If the detected radio environment characteristics imply a static or slow moving radio environment, the UE attempts to detect additional antennas and use them for neighbour cell measurements.

In yet another embodiment of the present invention the radio environment characteristics include a speed of the UE. The UE first detects its speed (e.g. using Doppler frequency or any other appropriate method) and then, if its speed is below a threshold value, detects additional transmit antenna ports at all the neighbour cells. The speed threshold value can be UE specific, a predefined value, or signalled/configured by the network. In yet another embodiment of the present invention the selected radio environment characteristics include a channel delay spread of a channel on which reference signals are received. At low channel delay spread it might be preferable that the UE uses more than one transmit antenna port for cell measurement since in such radio environment there is not enough time diversity. This means, if the delay spread of the channel is lower than a threshold value the UE performs blind detection of a plurality of transmit antenna ports at the neighbour cells. The delay spread threshold value can be UE specific, a predefined value, or signalled/configured by the network.

In yet a further embodiment of the present invention, both speed and delay spread can be used for deciding whether to use a single transmit antenna port or a plurality of transmit antenna ports. If the speed of the UE is high (i.e. above a threshold) then it is not necessary to check delay spread since at high speed (regardless of delay spread), one transmit antenna port is sufficient for performing cell measurements. This is because high speed gives good time diversity, which is otherwise (i.e. at low speed) possible to achieve by using more transmit antenna ports. However if speed is low then it is important to check delay spread. If both speed and delay spread are low (i.e. below their respective thresholds) then it is valuable to be able to use more than a single transmit antenna port. This situation could arise in indoor or local area type environments wherein both speed and channel delay spread are low. Thus this radio environment does not provide any time diversity to the signals received in the UE. Note that low delay spread means single or fewer paths closely located in time i.e. all with same fading which provides no time diversity. However, there are situations wherein the speed is low but delay spread is large. In this case a single transmit antenna port for cell measurement might also work due to large delay spread, which will ensure some level of time diversity. This type of situation arises when the user is standing or is moving with low speed but is significantly obstructed from the eNode B by large objects thereby all paths are received via reflections resulting in large delay spread.

The decision to detect a single transmit antenna port or a plurality of transmit antenna ports is based on the detected selected radio environment characteristics. When the decision in step 36 is based on several radio environment characteristics the outcome of the decision is based on a combination of radio environment characteristics threshold values as previously described. As understood by the person skilled in the art the selection of the radio environment characteristics and the threshold values of the various radio environment characteristics could be set in various ways and to a variety of values respectively in order to determine whether to detect a single transmit antenna port or a plurality of transmit antenna ports.

Figure 4A:
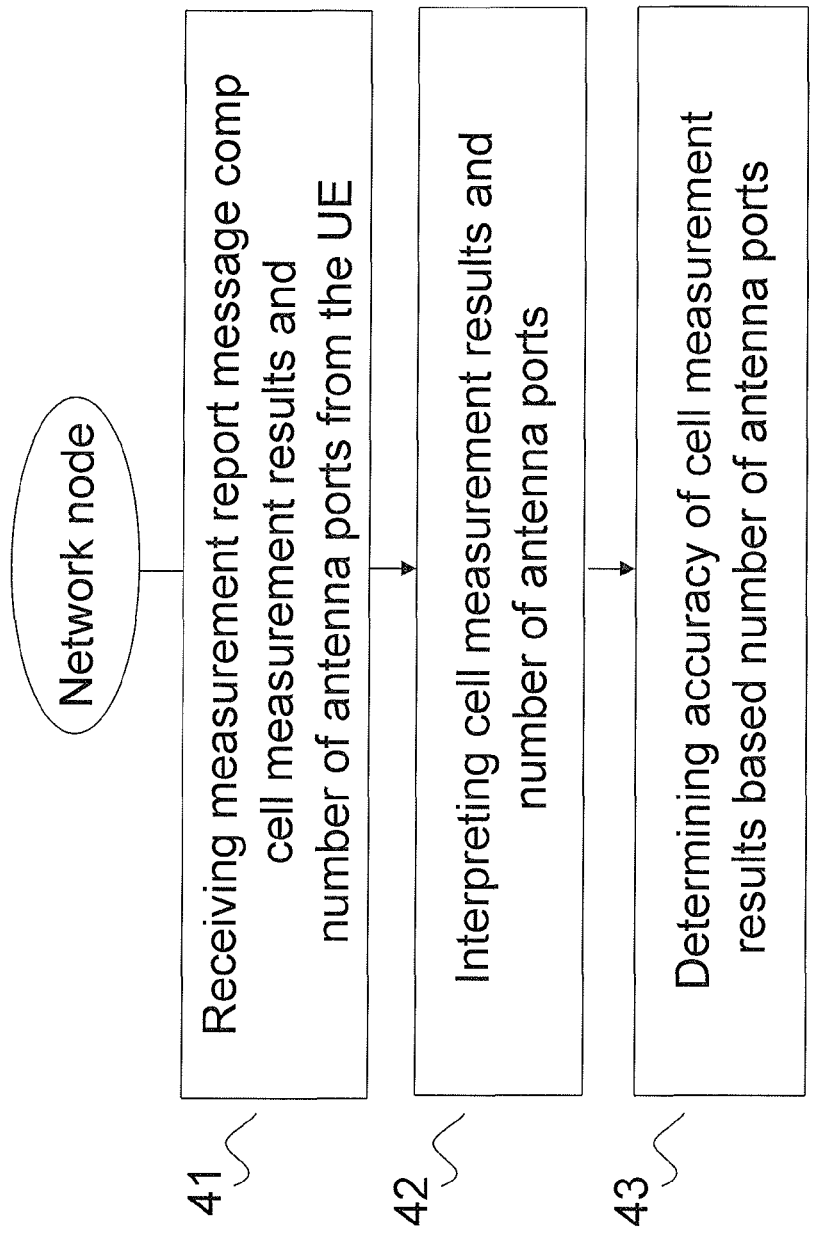
FIGS. 4a and 4b are flowcharts of the method in a network node according to embodiments of the present invention.
Figure 4B:
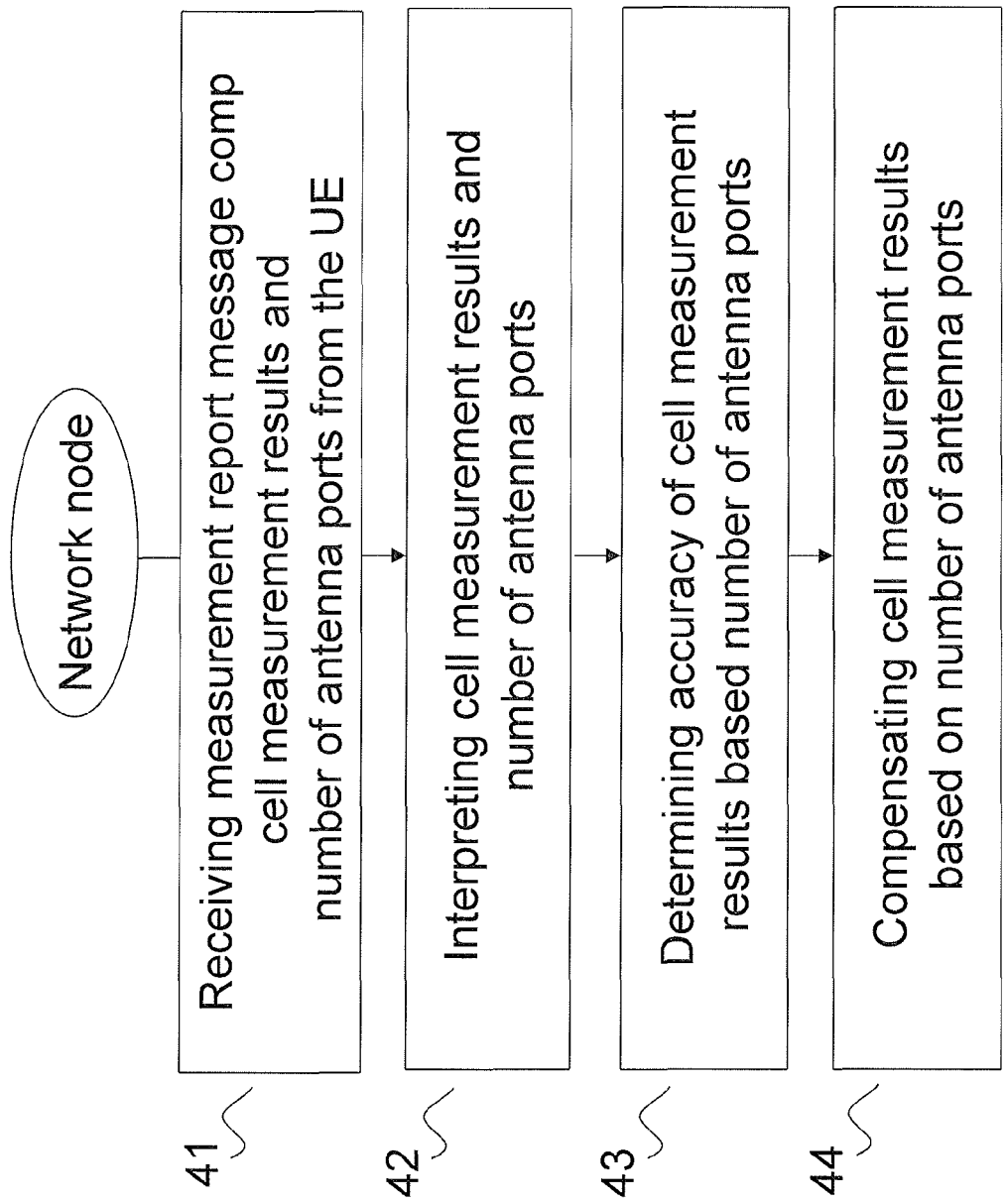

FIG. 4a shows a flowchart of the method in a network node according to an embodiment of the present invention. In a step 41, the network node receives the measurement report message from the UE. The measurement report message comprises the cell measurement result based on the performed cell measurement and information indicating the number of transmit antenna ports i.e. one or more antenna ports on which the cell measurement was performed. The network node interprets content of the measurement report message in a step 42. The network node is thus enabled to perform more accurate evaluations of signal conditions that the UE experiences. This will enable the network to be aware of exactly how many transmit antenna ports that are used for cell measurements. In a step 43 the network node determines the accuracy of the cell measurement result based on the number of transmit antenna ports. According to a further embodiment illustrated in FIG. 4b, the network node can compensate for any discrepancy in a step 44, e.g. apply additional offset to the cell measurement results if less than expected transmit antenna ports are used. Note that the serving eNode B could be aware of the actual number of transmit antenna ports used at the neighbour eNode Bs. For instance, assume that a first cell A bears two transmit antenna ports. Now consider that UE reports the measurement report message from cell A indicating the use of one transmit antenna for cell measurement. The network node of the serving cell can then use this information to apply any possible compensation to the measurement result before using it e.g. for handover. Based on the neighbour cell measurements reported by the UE, the network node of the serving cell decides the candidate neighbour cell for the handover. Eventually the network node of the serving cell sends the handover command to the UE corresponding to the selected candidate neighbour cell. Thus another advantage of the invention is that in case the network receives similar measurement reports (e.g. similar values of RSRP or RSRQ or in similar range) from two or more neighbour cells then the network can choose the neighbour cell, whose reported measurement is based on more than one antenna. This is because the cell measurement done on more than one antenna is more robust and reliable. In this way the probability of call dropping can be significantly reduced.

Figure 5:
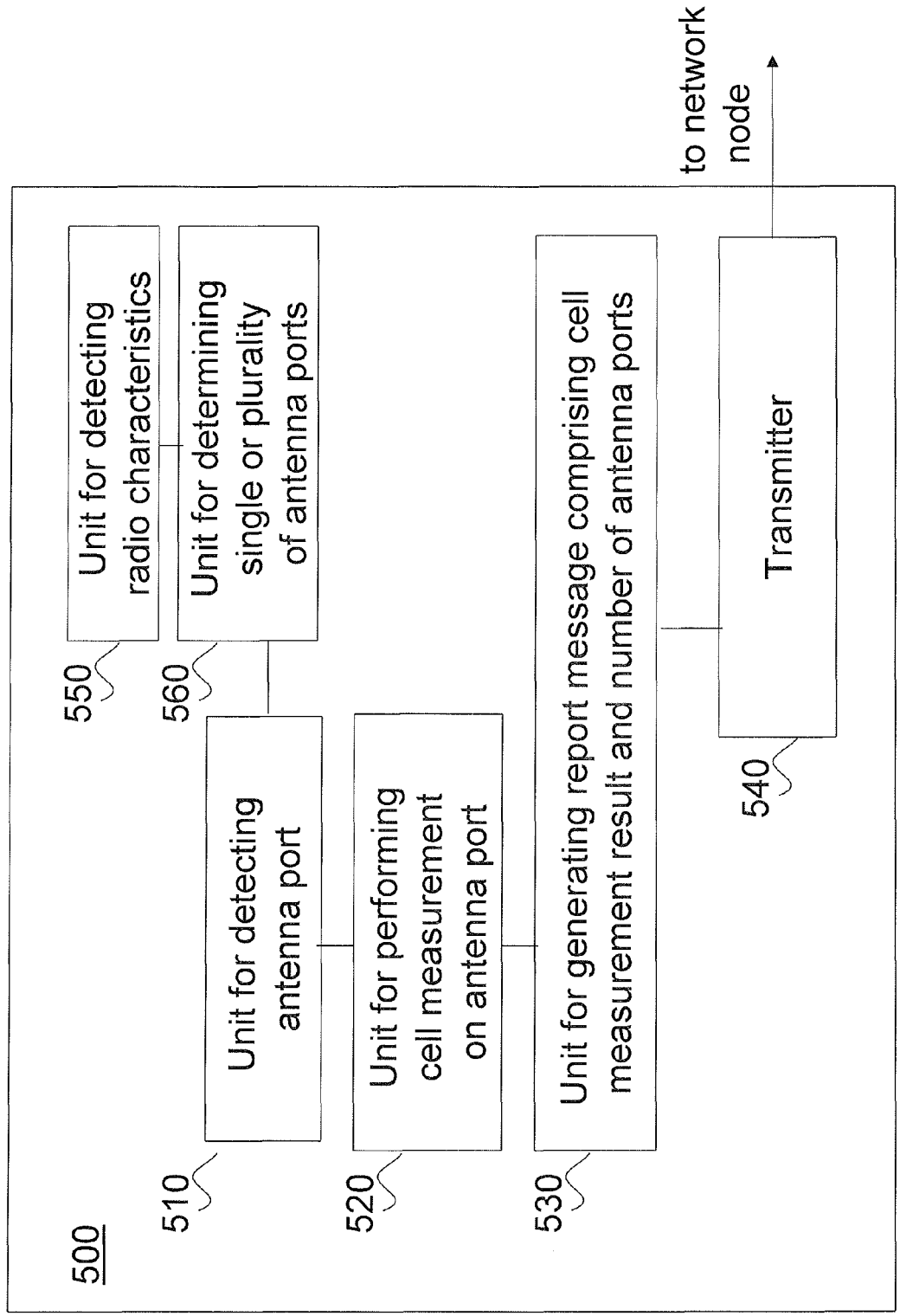
FIG. 5 illustrates an arrangement in a user equipment according to embodiments of the present invention.

To perform the method steps 31-36 in the UE for reporting cell measurement results, according to embodiments of the present invention, an arrangement 500 adapted to be used in the UE is arranged as illustrated in FIG. 5. The UE (denoted 12 in FIG. 1*b*) is adapted to be used in the cellular communication system. The UE reports cell measurements results via a radio interface between the UE and a network node in a cell serving the UE. The arrangement 500 comprises a unit for detecting 510 a number of transmit antenna ports at a neighbouring cell and a unit for performing cell measurement 520 on at least one detected transmit antenna port. The arrangement 500 also comprises a unit for generating a measurement report message 530. The measurement report message comprises a cell measurement result based on the performed cell measurement and information indicating the number of transmit antenna ports on which the cell measurement was performed. A transmitter for sending the generated measurement report message 540 to the network node is also included in the UE. According to a further embodiment of the present invention the arrangement 500 additionally comprises a unit for detecting 550 selected radio environment characteristics of the UE and a unit for determining 560 based on the selected detected radio environment characteristics whether to detect a single transmit antenna port or attempt to detect a plurality of transmit antenna ports.

Figure 6:
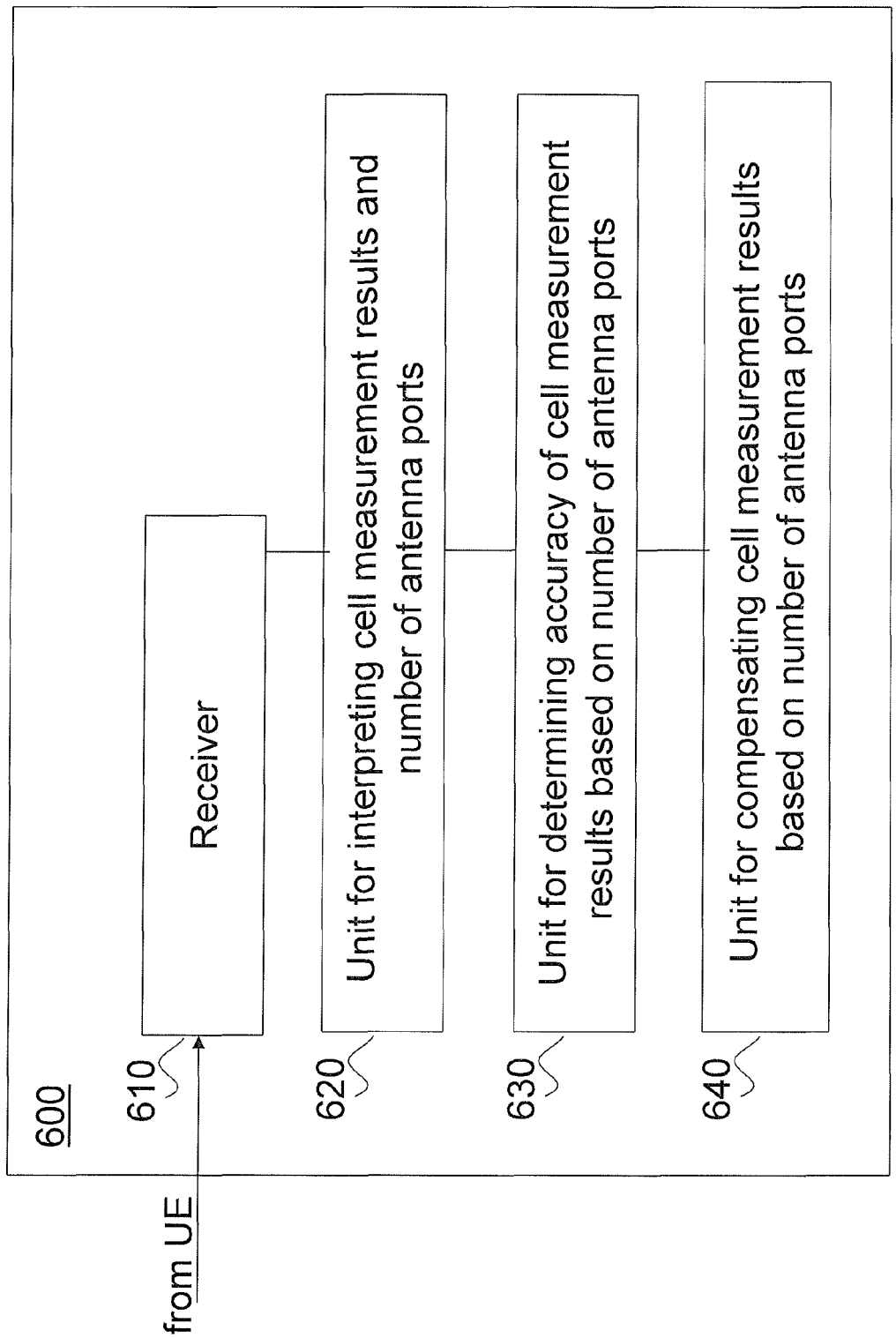
FIG. 6 illustrates an arrangement in a network node according to embodiments of the present invention.

To perform the method steps 41-44 in the network node of the cellular communication system for receiving cell measurement results, according to embodiments of the present invention, an arrangement 600 adapted to be used in the network node (denoted 11 in FIG. 1*b*) is arranged as illustrated in FIG. 6. The arrangement 600 comprises a receiver for receiving a measurement report message 610 from the UE. The measurement report message comprises a cell measurement result based on a performed cell measurement on a number of transmit antenna ports at a neighbouring cell and information indicating the number of transmit antenna ports on which the cell measurement was performed. The arrangement further comprises a unit for interpreting 620 the received cell measurement result and information indicating the number of transmit antenna ports. The arrangement additionally comprises a unit for determining 630 an accuracy of the cell measurement result based on the number of transmit antenna ports. According to a further embodiment of the present invention a unit for compensating 640 the cell measurement result based on the number of transmit antenna ports is comprised in the arrangement 600.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method in a user equipment, UE, configured to be used in a cellular communication system for reporting cell measurement results from the UE via a radio interface between the UE and a network node in a cell serving the UE, the method comprising:

detecting one or more transmit antenna ports at a neighboring cell;
   performing a cell measurement on at least one detected transmit antenna port at the neighboring cell;
   generating a measurement report message, the measurement report message comprising:
   a cell measurement result based on the performed cell measurement; and
   information indicating a number of transmit antenna ports at the neighboring cell on which the cell measurement was performed; and
   sending the measurement report message to said network node;
   wherein the information indicating the number of transmit antenna ports at the neighboring cell on which the cell measurement was performed enables the network node to determine an accuracy of the measurement report.

2. The method according to claim 1, wherein the information indicating the number of transmit antenna ports on which the cell measurement was performed is carried on at least one bit in the measurement report message.

3. The method according to claim 1, wherein the detecting step is performed by blind detection of transmit antenna ports.

4. The method according to claim 1, wherein the detecting step is performed by correlation over reference symbols sent at different transmit antenna ports.

5. The method according to claim 1, further comprising
   detecting selected radio environment characteristics of the UE; and
   determining, based on the selected detected radio environment characteristics, whether the step of detecting one or more transmit antenna ports at a neighboring cell is to include detection of a single transmit antenna port or attempted detection of a plurality of transmit antenna ports.

6. The method according to claim 5, wherein the selected radio environment characteristics include a speed of the UE and wherein said determining step includes attempted detection of a plurality of transmit antenna ports when the speed of the UE is below a threshold value.

7. The method according to claim 5, wherein the selected radio environment characteristics include a channel delay spread of a channel on which reference signals are received, and wherein said determining step includes attempted detection of a plurality of transmit antenna ports when the channel delay spread is below a threshold value.

8. The method according to claim 6, wherein the threshold value is specific to the UE.

9. The method according to claim 6, wherein the threshold value is a predefined value.

10. The method according to claim 6, wherein the threshold value is configured by the cellular communication system.

11. The method according to claim 6, wherein the threshold value is signalled by the network node to the UE.

12. A method in a network node of a cellular communication system for receiving cell measurement results, the method comprising:
    receiving a measurement report message from a user equipment, UE, wherein the measurement report message comprises:
    a cell measurement result based on a performed cell measurement on one or more transmit antenna ports at a neighboring cell; and
    information indicating a number of transmit antenna ports at the neighboring cell on which the cell measurement was performed;

interpreting said cell measurement result and said information indicating the number of transmit antenna ports on which the cell measurement was performed; and determining an accuracy of said cell measurement result based on the number of transmit antenna ports on which the cell measurement was performed.

13. The method according to claim 12, wherein the number of transmit antenna ports at the neighboring cell on which the cell measurement was performed differs from an expected number of transmit antenna ports, and the method further comprises compensating said cell measurement result based on the number of transmit antenna ports at the neighboring cell on which the cell measurement was performed.

14. The method according to claim 13, wherein said compensation is performed by applying additional offset to the cell measurement result if the number of transmit antenna ports at the neighboring cell on which the cell measurement was performed is less than said expected number of transmit antenna ports.

15. The method according to claim 12, wherein the network node is an evolved NodeB in an evolved Universal Terrestrial Radio Access Network.

16. The method according to claim 12, wherein the network node is a radio network controller in a Universal Terrestrial Radio Access Network.

17. An arrangement in a user equipment, UE, configured to be used in a cellular communication system for reporting cell measurement results from the UE via a radio interface between the UE and a network node in a cell serving the UE, the arrangement comprising:
   a unit for detecting one or more transmit antenna ports at a neighboring cell;
   a unit for performing a cell measurement on at least one detected transmit antenna port at the neighboring cell;
   a unit for generating a measurement report message, the measurement report message comprising:
      a cell measurement result based on the performed cell measurement; and
      information indicating a number of transmit antenna ports at the neighboring cell on which the cell measurement was performed; and
   a transmitter for sending the measurement report message to said network node;
   wherein the information indicating the number of transmit antenna ports at the neighboring cell on which the cell measurement was performed enables the network node to determine an accuracy of the measurement report.

18. The arrangement according to claim 17, wherein the information indicating the number of transmit antenna ports on which the cell measurement was performed is carried on at least one bit in the measurement report message.

19. The arrangement according to claim 17, wherein the arrangement is arranged to detect the one or more transmit antenna ports by performing blind detection of transmit antenna ports.

20. The arrangement according to claim 17, wherein the arrangement is arranged to detect the one or more transmit antenna ports by performing correlation over reference symbols sent at different transmit antenna ports.

21. The arrangement according to claim 17, further comprising:
   a unit for detecting selected radio environment characteristics of the UE; and
   a unit for determining, based on a selected detected radio environment characteristics, whether the unit for detecting one or more transmit antenna ports at the neighboring cell is to detect a single transmit antenna port or attempt to detect a plurality of transmit antenna ports.

22. The arrangement according to claim 21, wherein the selected radio environment characteristics include a speed of the UE, and wherein the arrangement is configured to determine that the unit for detecting one or more transmit antenna ports at the neighboring cell is to attempt to detect a plurality of transmit antenna ports when the speed of the UE is below a threshold value.

23. The arrangement according to claim 21, wherein the selected radio environment characteristics include a channel delay spread of a channel on which reference signals are received, and wherein the arrangement is configured to determine that the unit for detecting one or more transmit antenna ports at the neighboring cell is to attempt to detect a plurality of transmit antenna ports when the channel delay spread is below a threshold value.

24. The arrangement according to claim 22, wherein the threshold value is specific to the UE.

25. The arrangement according to claim 22, wherein the threshold value is a predefined value.

26. The arrangement according to claim 22, wherein the threshold value is configured by the cellular communication system.

27. The arrangement according to claim 22, wherein the threshold value is signalled by the network node to the UE.

28. An arrangement in a network node of a cellular communication system for receiving cell measurement results, the arrangement comprising:
   a receiver for receiving a measurement report message from a user equipment, UE, wherein the measurement report message comprises:
      a cell measurement result based on a performed cell measurement on one or more transmit antenna ports at a neighboring cell; and
      information indicating a number of transmit antenna ports at the neighboring cell on which the cell measurement was performed;
   a unit for interpreting said cell measurement result and said information indicating the number of transmit antenna ports at the neighboring cell on which the cell measurement was performed; and
   a unit for determining an accuracy of said cell measurement result based on the number of transmit antenna ports at the neighboring cell on which the cell measurement was performed.

29. The arrangement according to claim 28, wherein the number of transmit antenna ports at the neighboring cell on which the cell measurement was performed differs from an expected number of transmit antenna ports, and the arrangement further comprises a unit for compensating said cell measurement result based on the number of transmit antenna ports at the neighboring cell on which the cell measurement was performed.

30. The arrangement according to claim 29, wherein the arrangement is arranged to compensate said cell measurement result by applying additional offset to the cell measurement result if the number of transmit antenna ports at the neighboring cell on which the cell measurement was performed is less than said expected number of transmit antenna ports.

31. The arrangement according to claim 28, wherein the network node is an evolved NodeB in an evolved Universal Terrestrial Radio Access Network.

32. The arrangement according to claim 28, wherein the network node is a radio network controller in a Universal Terrestrial Radio Access Network.

\* \* \* \* \*